(12) United States Patent
Lowe

(10) Patent No.: US 12,376,585 B2
(45) Date of Patent: Aug. 5, 2025

(54) NANOSTRUCTURED METALLIC SUBSTRATES AND SURFACES TO DEACTIVATE MICROBES

(71) Applicant: Colorado School of Mines, Golden, CO (US)

(72) Inventor: Terry C. Lowe, Golden, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 937 days.

(21) Appl. No.: 17/494,500

(22) Filed: Oct. 5, 2021

(65) Prior Publication Data

US 2022/0104484 A1 Apr. 7, 2022

Related U.S. Application Data

(60) Provisional application No. 63/088,358, filed on Oct. 6, 2020.

(51) Int. Cl.
| | | |
|---|---|---|
| *A01N 25/08* | (2006.01) | |
| *A01N 59/00* | (2006.01) | |
| *A01N 59/06* | (2006.01) | |
| *A01N 59/16* | (2006.01) | |
| *A01N 59/20* | (2006.01) | |
| *C23C 30/00* | (2006.01) | |

(52) U.S. Cl.
CPC ............ *A01N 25/08* (2013.01); *A01N 59/00* (2013.01); *A01N 59/06* (2013.01); *A01N 59/16* (2013.01); *A01N 59/20* (2013.01); *C23C 30/00* (2013.01)

(58) Field of Classification Search
None
See application file for complete search history.

(56) References Cited

PUBLICATIONS

Chen et al., "CuO nanowires synthesized by thermal oxidation route," Journal of Alloys and Compounds, vol. 454, No. 1-2, Apr. 24, 2008, pp. 268-273.
Elinas et al., "Is There a Threshold in the Antibacterial Action of Superhydrophobic Surfaces?," ACS Applied Materials & Interfaces, vol. 9, No. 45, Oct. 23, 2017, pp. 39781-39789.
Fuller et al., "The effect of surface roughness on the adhesion of elastic solids," Proceedings of the Royal Society A, vol. 345, No. 1642, Sep. 30, 1975, pp. 327-333.

(Continued)

*Primary Examiner* — Anthony M Liang
(74) *Attorney, Agent, or Firm* — Sheridan Ross P.C.

(57) ABSTRACT

A configuration of nanoscale metal or metal oxide projections on the surface of a metal substrate is provided. The configuration, because of their nanoscale geometric characteristics, create non-uniform distributions of electrical surface charge, which can rapidly transfer into nearby microbes to reduce or eliminate their pathogenicity. The charge transfer disrupts the microbe outer membrane and inactivates pathogenic processes. One embodiment of a nano surface architecture is provided that is suitable for inactivating viruses or killing bacteria via enhanced charge transfer. A range of nanoprojection spacings, sizes, and shapes are provided. A high shear deformation process to create high-angle grain boundaries and specific grain sizes in metal or alloy substrates suited for nucleating and growing nanoprojections that possess the characteristics needed to deactivate microbes is also provided. Also provided are embodiments of high shear deformation to make the suitable substrates and thermal oxidation processes to cultivate nanoprojections.

19 Claims, 5 Drawing Sheets

(56) References Cited

PUBLICATIONS

Horita et al., "Microstructures and microhardness of an aluminum alloy and pure copper after processing by high-pressure torsion," Materials Science and Engineering: A, vol. 410-411, Nov. 25, 2005, pp. 422-425.
Kozhushner et al., "Influence of an External Electric Field on the Charge and Field Distributions in a Metal Tip," Journal of Experimental and Theoretical Physics, vol. 130, Apr. 1, 2020, pp. 198-203.
Pasquet et al., "Antimicrobial activity of zinc oxide particles on five micro-organisms of the Challenge Tests related to their physicochemical properties," International Journal of Pharmaceutics, vol. 460, No. 1-2, Jan. 2, 2014, pp. 92-100.
Seo et al., "Engineering copper nanoparticles synthesized on the surface of carbon nanotubes for anti-microbial and anti-biofilm applications," Nanoscale, vol. 10, No. 33, Jul. 2, 2018, pp. 15529-15544.
"Search Federal Pesticide Products," Purdue University National Pesticide Information Retrieval System, Copyright 1998, retrieved from http://npirspublic.ceris.purdue.edu/ppis/, 2 pages.
Bleichert et al., "Inactivation of bacterial and viral biothreat agents on metallic copper surfaces," Biometals, Aug. 7, 2014, 11 pages.
Chen et al., "CuO nanowires synthesized by thermal oxidation route," Journal of Alloys and Compounds, vol. 454, No. 1-2, Apr. 24, 2008, pp. 268-273. Abstract only.
Elinas et al., "Is There a Threshold in the Antibacterial Action of Superhydrophobic Surfaces?," ACS Applied Materials & Interfaces, vol. 9, No. 45, Oct. 23, 2017, pp. 39781-39789. Abstract only.
Fuller et al., "The effect of surface roughness on the adhesion of elastic solids," Proceedings of the Royal Society A, vol. 345, No. 1642, Sep. 30, 1975, pp. 327-333. Abstract only.
Grass et al., "Metallic Copper as an Antimicrobial Surface," Applied and Environmental Microbiology, vol. 77, No. 5, Mar. 2011, 7 pages.
Horita et al., "Microstructures and microhardness of an aluminum alloy and pure copper after processing by high-pressure torsion," Materials Science and Engineering: A, vol. 410-411, Nov. 25, 2005, pp. 422-425. Abstract only.
Koczulla et al., "Comparison of exhaled breath condensate pH using two commercially available devices in healthy controls, asthma and COPD patients," Respiratory Research, vol. 10, No. 78, 2009, 8 pages.
Kozhushner et al., "Influence of an External Electric Field on the Charge and Field Distributions in a Metal Tip," Journal of Experimental and Theoretical Physics, vol. 130, Apr. 1, 2020, pp. 198-203. Abstract only.
Michen et al, "Isoelectric points of viruses," Journal of Applied Microbiology, vol. 109, 2010, pp. 388-397.
Nowack et al., "120 Years of Nanosilver History: Implications for Policy Makers," Environmental Science & Technology, vol. 45, 2011, pp. 1177-1183.
Ozcelik et al., "Electric charge of nanopatterned silica surfaces," vol. 21, Mar. 13, 2019, 12 pages.
Pasquet et al., "Antimicrobial activity of zinc oxide particles on five micro-organisms of the Challenge Tests related to their physicochemical properties," International Journal of Pharmaceutics, vol. 460, No. 1-2, Jan. 2, 2014, pp. 92-100. Abstract only.
Pogodin et al., "Biophysical Model of Bacterial Cell Interactions with Nanopatterned Cicada Wing Surfaces," Biophysical Journal, vol. 104, Feb. 2013, pp. 835-840.
Rohrer, "Grain boundary energy anisotropy: a review," Journal of Materials Science, vol. 46, 2011, pp. 5881-5895.
Sakai et al., "Dynamic and post-dynamic recrystallization under hot, cold and severe plastic deformation conditions" Progress in Materials Science, vol. 60, Mar. 2014, pp. 130-207.
Scheller et al., "Physicochemical properties of SARS-COV-2 for drug targeting, virus inactivation and attenuation, vaccine formulation and quality control," Electrophoresis, vol. 41, May 22, 2020, pp. 1137-1151.
Schmidt et al., "Copper alloy surfaces sustain terminal cleaning levels in a rural hospital," American Journal of Infection Control, vol. 44, 2016, pp. e195-e203.
Seo et al., "Engineering copper nanoparticles synthesized on the surface of carbon nanotubes for anti-microbial and anti-biofilm applications," Nanoscale, vol. 10, No. 33, Jul. 2, 2018, pp. 15529-15544. Abstract only.
Singh et al., "Adhesion between Nanoscale Rough Surfaces," Journal of Colloid and Interface Science, vol. 232, 2000, pp. 10-16.
Sun et al., "Atomic-Scale Mechanism of Unidirectional Oxide Growth," Advanced Functional Materials, 2019, 1906504, Author Manuscript Version, 26 pages.
Toth et al., "The Mechanics of High Pressure Compressive Shearing with Application to ARMCO® Steel," Materials Characterization, vol. 154, 2019, pp. 127-137.
Valiev et al., "Bulk nanostructured materials from severe plastic deformation," Progress in Materials Science, vol. 45, 2000, pp. 103-189.
Warnes et al., "Inactivation of Murine Norovirus on a Range of Copper Alloy Surfaces is Accompanied by Loss of Capsid Integrity," Applied and Environmental Microbiology, vol. 81, No. 3, Feb. 2015, pp. 1085-1091.
Wu et al., "Role of the Surface Nanoscale Roughness of Stainless Steel on Bacterial Adhesion and Microcolony Formation," ACS Omega, vol. 3, No. 6, Jun. 15, 2018, pp. 6456-6464.
Landau et al., "Electrodynamics of Continuous Media," Pergamon Press, 1960.

NANOSTRUCTURED METALLIC SUBSTRATES AND SURFACES TO DEACTIVATE MICROBES

CROSS REFERENCE TO RELATED APPLICATIONS

This application claims priority to U.S. Provisional Application No. 63/088,358, filed on Oct. 6, 2020, and entitled "Nanostructured Metallic Substrates and Surfaces to Deactivate Microbes", the entirety of which is hereby incorporated by reference.

FIELD

The present disclosure is generally directed to antimicrobial metallic materials with metal and metal oxide surface nanoprojections. In particular, the antimicrobial metallic materials are tailored to enhance the surface adsorption of microbes and then rapidly disrupt the microbes by a charge transfer to reduce or eliminate their pathogenicity.

BACKGROUND

Pathogenic bacteria and viruses cause infectious diseases in humans and other living beings. The ability of microbes to survive and migrate within the environments in which people live allows infectious diseases to propagate. Measures to reduce the spread of microbial-caused disease include the use of various forms of sterilization, disinfectants, physical barriers, filters, and societal practices such as interpersonal physical separation, and isolation. Amongst these measures is the use of inorganic solid metallic antimicrobial agents such as silver (B. Nowack et al., *Environ Science & Tech*, 45 (2011) 1177-1183), copper (M. G. Schmidt, et al., *Amer J Infection Control*, 44 (2016) 203-209), which is incorporated herein in its entirety by reference, zinc (J. Pasquet, et al. *Intl J Pharmaceutics*, 460 (2014) 92-100), which is incorporated herein in its entirety by reference, and the oxides of these metals. Antimicrobial metals and metal-containing compounds have been registered in the USA Environmental Protection Agency (EPA) National Pesticide Information Retrieval System (http://ppis.ceris.purdue.edu/npublic.htm) since the 1950s. The efficacy of these registered biocides varies widely, with each substance exhibiting antimicrobial properties for specific pathogens and with different rates at which they inactivate microbes. For example, irreversible destruction of human corona virus 229E (HuCoV-229E) on copper alloys has been shown to require between 2 minutes and several days (Warnes, et al. "*Inactivation of Murine Norovirus on Copper Alloy Surface is Accompanied by Loss of Capsid Integrity*" *Appl Env Microbiology*, 6 (2015) e01697-15), which is incorporated herein in its entirety by reference. For dry conditions simulating fingertip-touch surface conditions, the shortest time measured for deactivation of the human corona virus 229E virus was 2 minutes for high purity copper surfaces. For wet-droplet conditions, the contact times for reducing HuCoV-229E from 1000 plaque-forming units (PFU) to 1 PFU on various copper alloys containing more than 85 weight percent copper were 20 minutes and longer. For comparison, conventional antimicrobial liquid disinfectants registered with the EPA contain active ingredients such as hydrogen peroxide, quaternary ammonium, sodium hypochlorite, citric acid, chlorine dioxide, or isopropanol. The instructions for the use of the disinfectants specify durations of contact between the disinfecting solutions and the microbes that range from 0.25 minutes (for Clorox Spruce-Ups, Reg. 5813-38) to 30 minutes (for Ameriplus 2.2% sodium hypochlorite, Reg. 88049-2). The average contact time for the over 400 EPA-registered disinfectants is 6.7 minutes.

The amount of time needed for deactivation is a significant factor for limiting the spread of respiratory viruses that can migrate between human hosts via droplets, aerosols, or attached to other particles emitted by breathing, coughing, or sneezing. Viruses may remain viable on most surfaces for hours to days. It is advantageous to deactivate them rapidly, especially when they attach to frequently touched surfaces such as doorknobs, handrails, elevator buttons in public spaces, and throughout hospitals where high viral and bacterial loads are expected. Personal protective equipment (PPE) such as masks, gowns, and gloves provide physical barriers that reduce the probability of pathogens that are airborne or on surfaces from infecting human tissues. However, all surfaces, including those of PPE, remain hazardous so long as they possess bacterial or viral loading. Filters that trap microbes can reduce the access of microbes to human tissues, but the filters do not necessarily deactivate microbes. Thus, the risk of infection can be mitigated by PPE, but is not eliminated. Disinfectants and sterilization using EPA-registered substances have antimicrobial effects, but only when used properly, including maintaining contact with the pathogens for the recommended period of time specified in the U.S. EPA record of registration. One purpose of this disclosure is to identify specific nanoscale structures that can be fabricated onto the surface of metals and alloys to enable a mechanism which can rapidly reduce the populations of adsorbed pathogenic microbes, deactivating viruses and killing bacteria in seconds rather than the minutes-to-hours, as is typical for conventional antimicrobial metals, metallic compounds, or chemical solutions.

The period of time needed by an antimicrobial agent to deactivate viruses and kill bacteria depends upon the mechanism by which the agent eliminates pathogenicity. Multiple mechanisms have been studied and reported (P. Bleichert, et al., *Biometals* 27 (2014) 1179-1189; Grass, et al., *Applied and Environmental Microbiology*, 77 (2011) 1541-1547), which is incorporated herein in its entirety by reference. For example, the published mechanisms by which copper kills bacteria and inactivates viruses have been shown to depend on the release of copper ionic species (Warnes, et al., *mBio*, 6 (2015) e10697-15), which is incorporated herein in its entirety by reference. The rate of release of copper ions depends on the rate of chemical reactions involving copper, which are influenced by the rate of transport of ions, the pH of pathogen-containing solutions, and the chemical driving force for the relevant reactions. These time-dependent mechanisms limit the speed at which copper and other metals act as antimicrobial agents. Also, these mechanisms operate in the presence of metals such as copper, independent of the surface topography. The documented timescale for copper ions to cause deactivation or killing ranges from a few minutes to hours. Similar timescales operate for the ions of other metals, for example, silver and zinc. In this disclosure, we specify nanoscale surface structures that provide an additional mechanism for deactivating the pathogenicity of microbes that operates at intrinsically short timescales.

SUMMARY

The present disclosure introduces the ability to create non-uniform distribution of electrical charge over multinanometer dimensions on surfaces that, in turn, enable specific interactions between the surface and microbes. Classical electrodynamics (Ladau and Lifshitz, *Electrodynamics of Continuous Media*, Pergamon Press, 1960), which is incorporated herein in its entirety by reference, teaches that the curvature of surfaces causes a non-uniform distribution of surface charge. This phenomenon is known to operate at a range of geometric size scales, but novel behaviors emerge when the dimensions and radii of curvature of surface features approach the nanometer scale. The phenomenon of surface charge non-uniformity at the nanometer scale has been applied to create devices such as sensors and instruments, for example, atomic force microscopes and three-dimensional atom probes, which depend on nanometrically small features for their operation. The electronic properties of surfaces of metals have also been explored to introduce useful features for other applications. For example, the growth of nanowires on copper surfaces and other metal surfaces has been extensively studied (Chen, et al. *J. Alloys and Compounds*, 454, 2008, 268-273), which is incorporated herein in its entirety by reference, to show how surface protrusions with lengths from 0.5 μm to 10 μm can be grown. Nanowires possess shapes that favor non-uniform charge distribution. However, they typically have dimensions on the scale of several micrometers. These sizes, while suited for prospective electronics and sensor applications, are too large for interacting effectively with microbes. Non-uniform charge distribution has been explored in smaller nanometer scale systems, for example, for nanopatterned silica surfaces immersed in ionic fluids (Ozcelik and Barisik, *Phys. Chem. And Chem. Phys.*, 21, 2019, 7576-7587), which is incorporated herein in its entirety by reference. The degree of non-uniform surface charge has been predicted to vary with nanoscale roughness, ionic concentration, and pH of the ionic fluid, which may lead to surface patterns that can be tailored to produce specific interactions with microbes, especially viruses, which themselves have nanoscale dimensions. For example, it has been shown that "nanosized bumps" on the surface of a conductor can significantly increase the electric field near the bumps (Kozhushner, et al., *Journal of Experimental and Theoretical Physics* 130, 2020, 198-203), which is incorporated herein in its entirety by reference. For typical charge densities in metals, the electric field strength at the tip of an asperity 30 atomic lattice spacings in height is a factor of 4 greater higher than for a flat conductor. This differential in electric field strength can provide the driving force for movement of charge, that is, rapid electron transport in or near such a surface.

Research on nanoscale structure discloses the prospective antimicrobial effects of nanoscale structures such as nanoparticles (Seo, et al., *Nanoscale*, 10 (2018) 15529-15544), which is incorporated herein in its entirety by reference, nanotextured surfaces (Ellinas, et al., *ACS Appl. Mater. Interfaces*, 9, 2017, 39781-39789), which is incorporated herein in its entirety by reference, or nanopillars (Pogodin, et al., *Biophysical Journal*, 104, 2013, 835-840), which is incorporated herein in its entirety by reference. This body of research describes how nanoscale features alter the local concentrations of metal ions in solution above a surface or how the nanoscale pillars stretch, penetrate, and rupture the membranes of microbes. For example, nanoscale surface roughness alters the local ion concentration, which can degrade the intracellular processes within microbes. However, these mechanisms still depend on the time-limited ion dissolution and transport. The mechanical interaction and microbe membrane rupture by nanopillars has been described for bacteria, but not viruses, which are typically ten-fold smaller than bacteria. The mechanisms of nanoscale antimicrobial action that have been reported differ from the mechanism that operates in the present disclosure: rapid charge transfer from surfaces with non-uniform charge distribution.

A metal substrate with internal nanostructures that are designed to foster the growth of nanoscale surface projections can nearly instantaneously inactivate viruses and kill bacteria via transfer of electrical charge according to at least one embodiment of the present disclosure is provided. A magnitude of charge transfer enabled by the surface projections is sufficient to disrupt the microbial outer membranes and disable one or more sub-cellular functions that contribute to microbial pathogenicity. A magnitude of the charge concentration for the nanostructures can be sufficiently large that the disruption does not depend on the composition or structure of the virus capsid layer or bacterial outer membrane. At least one embodiment of the present disclosure provides for the nanoscale structures inside metallic substrates that in turn cause the formation of nanoprojections that can be crafted to have dimensions that make them biocidal. The combination of designating the specific characteristics of nanoprojections that impart antimicrobial effects, a process to create bulk nanostructured substrates suited for synthesizing such nanoprojections, and a process to cultivate nanoprojections possessing the specified characteristics is provided.

The disclosure provides for inactivating viruses or killing bacteria via enhanced charge transfer from a nano surface architecture that is tailored for one or more specific pathogens. The disclosure also provides for a metal substrate with metal and metal oxide nanoprojections that create non-uniform surface charge distributions and enhance surface adsorption of microbes. The disclosure further provides grain size and grain boundary misorientations that enable the nucleation and growth of nanoprojections with characteristics best suited for inactivating pathogens via charge transfers. The mechanism of microbe deactivation by charge transfer acts in addition to other known antimicrobial mechanisms associated with metal and metal oxide surfaces.

In at least one embodiment, a metallic material for disrupting a microbe species is provided comprising: a substrate surface; at least one nanoscale metal or metal oxide surface projection on the substrate surface, and at least one nanoscale metal or metal oxide surface configured to induce a non-uniform charge to at least one of reducing or eliminating a pathogenicity of microbes by a charge transfer.

In at least one embodiment, the metallic material is implemented using at least one of a metal or alloy object and comprising at least one of a sheet, strip, bar, plate, rod, wire, or other solid shape produced by at least one of drawing, rolling, stamping, extrusion, solidification or casting, wherein the at least one nanoscale metal or metal oxide surface projections is separated by a distance in a plane of the substrate surface that is 5% greater than a maximum feret diameter of a microbial species to be killed or inactivated. In at least one embodiment, the metallic material is implemented with 50% of the surface projections having a diameter at each base where each projection emerges from the substrate surface is equal to or less than one-half a maximum feret diameter of a microbe to be inactivated. In at least one embodiment, the difference between a base radius and a tip radius of at least 80% of the surface projections, normalized by a projection height minus the tip radius, is less than or equal to 0.1763. In at least one embodiment, a height of each projection is 2-fold greater than a base radius for at least 50% of the surface projections. In other embodiments, a height of each projection is 5-fold greater than a base radius for at least 50% of the surface projections. In at least one embodiment, at least 50% of the surface projections are located at intersections of substrate grain boundaries and the substrate surface. In other embodiments, at least 50% of the surface projections are located at intersections of substrate grain boundaries and the substrate surface. In at least one embodiment, the at least one of a metal or alloy object is produced using high shear deformation to increase a density of grain boundary sites for nucleating and growing projections, corresponding to having 65% of all surface grains possessing grain boundary intercept lengths between 1.05 times and 8.5 times the maximum feret diameter of the microbe to be inactivated. In other embodiments, the at least one of a metal or alloy object is produced using high shear deformation to increase a density of grain boundary sites for nucleating and growing projections, corresponding to having 90% of all surface grains possessing grain boundary intercept lengths between 1.05 times and 8.5 times the maximum feret diameter of the microbe to be inactivated. In at least one embodiment, 50% of grain boundaries intersecting the substrate surface have grain-to-grain crystallographic misorientation angles greater than 15°. In at least one embodiment, an average grain size at the substrate surface is between 0.020 micrometers and 2.5 micrometers. In at least one embodiment, the at least one of a metal or alloy object comprises more than 60 weight percent Copper, Zinc, Lithium, Sodium, Potassium, Magnesium, Calcium, Aluminum, or Silver.

A material for disrupting a microbe species having a maximum feret diameter according to at least one embodiment of the present disclosure comprises a plurality of projections extending from a surface of said material, wherein each projection of the plurality of projections each have a base radius; wherein a minimum spacing of adjacent projections of the plurality of projections is 5% greater than a sum of the maximum feret diameter and two times the base radius; and wherein a maximum spacing of projections of the plurality of projections is nine times said maximum feret diameter.

It at least one embodiment, the microbe species is SARS-CoV-2 and the maximum feret diameter is 120 nm. In at least one embodiment, each projection of the plurality of projections has a tip radius and a projection height, and wherein a difference between the base radius and the tip radius, divided by the projection height, is less than or equal to 0.1763. In at least one embodiment, at least 50% of each projection of the plurality of projections have the projection height greater than five times the base radius. In at least one embodiments, more than 50% of grain boundaries of the material have grain boundary misorientation angles greater than 15°. In at least one embodiment, more than 65% of grain boundary intercept lengths of the material are greater than the maximum feret diameter. In other embodiments, more than 90% of grain boundary intercept lengths of the material are greater than the maximum feret diameter. In still other embodiments, more than or less than 90% of grain boundary intercept lengths of the material are greater than the maximum feret diameter.

A method of manufacturing a material with projections for disrupting a microbe species having a maximum feret diameter according to at least one embodiment of the present disclosure comprises imposing a shear strain greater than or equal to 4 on the material to produce an average grain size of approximately 213 nm, and approximately 93.4% of grain intercepts of the material have a length less than 568 nm; and heating the material to between approximately 300° C. and 550° C. for between approximately 1.5 minutes to 30 minutes to create the plurality of projections that disrupt the microbe species.

In at least one embodiment, the material is at least one of Copper, Zinc, Lithium, Sodium, Potassium, Magnesium, Calcium, Aluminum, or Silver. In other embodiments, the material may be at least one of a wire, strip, rod, or any form of solid and the material may have dimensions in any of three orthogonal directions not less than 1 micrometer. In at least one embodiment, at least half of the projections of the plurality of projections have a diameter between approximately 33.8 nm and 57.1 nm. In at least one embodiment, at least half of the projections of the plurality of projections have a projection height between approximately 52.5 nm and 131.6 nm.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

Figure 1:
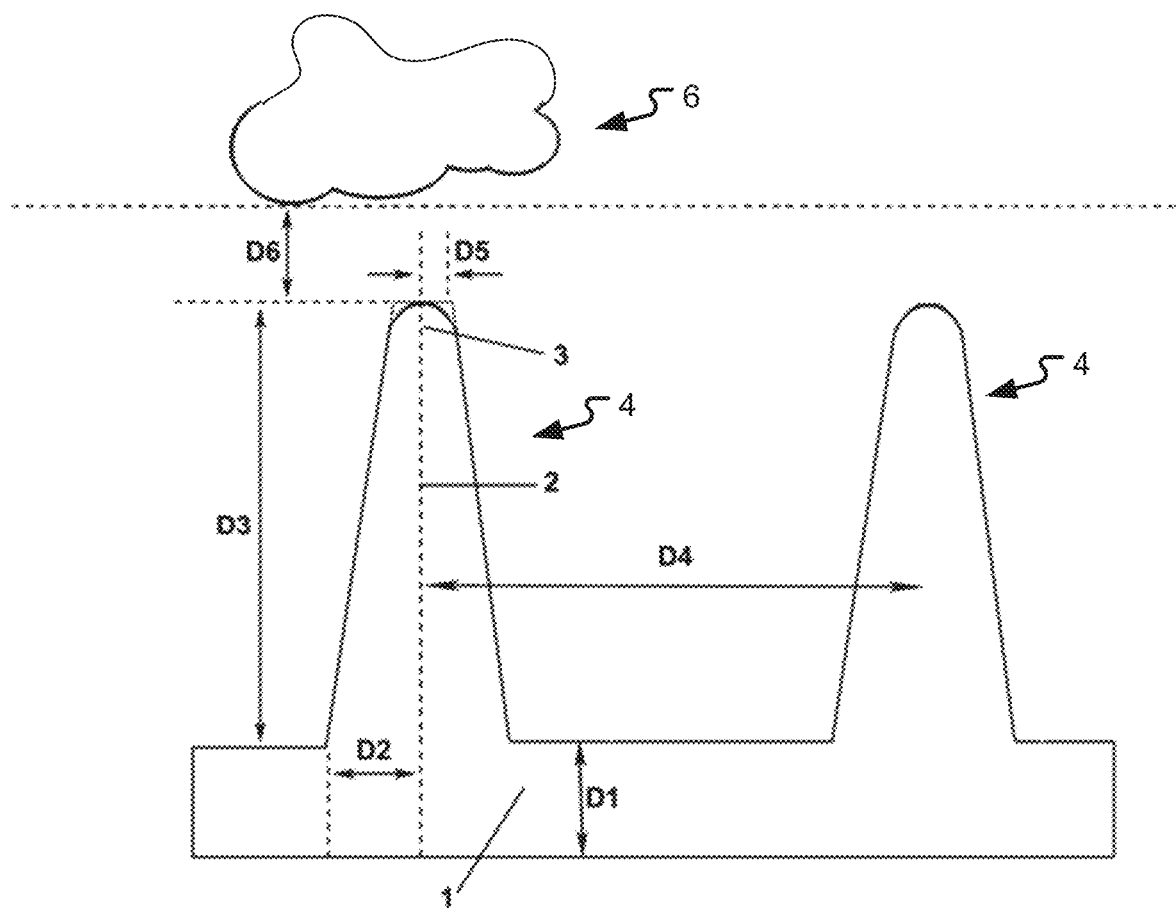
FIG. 1 is a schematic illustration of two projections from a surface extending to a microbe according to at least one embodiment of the present disclosure.

Similar components and/or features may have the same reference label. Further, various components of the same type may be distinguished by following the reference label by a letter that distinguishes among the similar components.

If only the first reference label is used, the description is applicable to any one of the similar components having the same first reference label irrespective of the second reference label.

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

Turning first to FIG. 1, a substrate surface 1 having at least one projection 4 is shown. In the illustrated embodiment, two projections 4 are shown. It will be appreciated that in other embodiments, the substrate surface 1 may include more than two projections 4. The substrate surface 1 may be a surface of a metal or alloy object. The object may be, for example, a sheet, strip, bar, plate, rod, wire, or other solid shape produced by at least one of drawing, rolling, stamping, extrusion, solidification, or casting.

The substrate surface may have a nano surface architecture that inactivates viruses or kills bacteria is provided. This architecture is configured to rapidly transfer charge to the microbes to inactivate or kill them. The mechanism of eliminating the infectivity of microbes relies upon creating a non-uniform surface charge distribution. This mechanism differs from conventional antimicrobial mechanisms, for example, for copper and silver surfaces, which depend mainly on the presence of metallic ions.

Figure 2:
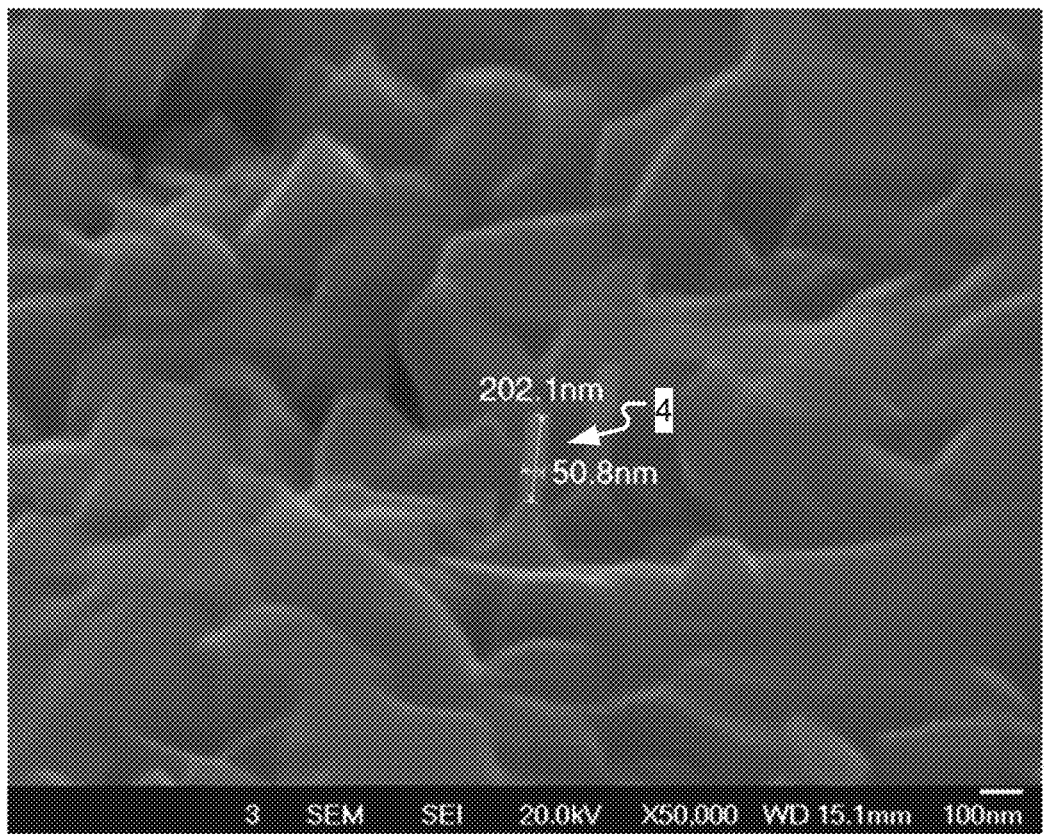
FIG. 2 is a scanning electron micrograph of two projections formed on polycrystalline 99.9% copper according to at least one embodiment of the present disclosure.

Non-uniformity of charge on a metal surface can be created by adding nanoprojections 4 with specific geometries and spacings. To determine the degree of charge concentration that can be created by a nanoprojection 4, it is convenient to approximate the projection 4 as a cone that tapers from its base where it intersects the substrate 1 (which may be, for example, a metal substrate) to a vertex extending away from the substrate 1. Using this approximation, the mathematical solutions of Bhattaharya can be used (K. Bhattacharya, *On the dependence of charge density on surface curvature of an isolated conductor, Physica Scripta* 91(3) (2016) 035501), which is incorporated herein in its entirety by reference, to estimate the degree of charge concentration arising from a surface projection 4. The charge density σ2 (Greek letter sigma) at a tip 3 of a projection 4 (which may be, for example, cone shaped) is proportional to the cone half-angle α as illustrated schematically in FIG. 1 and expressed by the following equation:

$$\sigma \propto \frac{1}{\sin(\alpha)\ln(\tan(\frac{\alpha}{2}))}$$

where the angle α can be computed from the radius D2 at the base of the projection, the radius D5 at the top of the projection, and the height of the projection, D3. Based on the proportionality from this equation, the amplification of charge attains a minimum for a cone half-angle of 33°, and has higher values for smaller half-angles. For example, a needle-like projection, such as illustrated schematically in FIG. 1, with a half-angle α of 1° has a charge density 8-fold greater than the minimum value for a half-angle of 33°. This ratio of maximum to minimum charge density decreases with increasing half-angle, to 4.69, 2.43, and 1.57 as the half-angle increases to 2°, 5°, and 10°, respectively. Smaller half-angles increase the degree of geometrically-induced charge concentration. Laboratory trials conducted growing nanoprojections 4 on 99.9% copper show that nanoprojections with half-angles between 2° and 10° can readily be fabricated, as shown, for example, in the scanning electron micrograph in FIG. 2. Thus, significant charge concentration may exist for the structure shown in FIG. 2. Charge concentration will exist in each of multiple projections extending from the substrate surface 1 that are separated from each other by a distance D4. The charge at the projection tip 3 in FIG. 1 differs from the intra-projection surface region in the base substrate 1, between two or more projections 4. At a distance below the substrate surface, designated D1, the charge density is lower and characteristic of the bulk metal substrate.

As shown, the tip 3 of the projection 4 extends to a microbe 6. A distance between the microbe 6 and the projection 4 may exist and is shown as D6. A charge may transfer between a projection such as, for example, the projection 4 and a microbe such as, for example, the microbe 6 via transfer within an ionic fluid or ionized gas such as atmospheric air through a distance D6. The distance D6 over which the charge can transfer depends upon a magnitude of a surface charge, local voltage, and ionization characteristics of the medium in the gap of size D6. It will be appreciated that the magnitude of D6 may be any size. Further, the mechanism of microbe deactivation can occur without contact between the microbe and the substrate surface features.

The actual amount of charge for projections 4 as shown in FIG. 1 can be computed by extrapolating from experimentally measured charge concentrations in published nano-patterned configurations. For the purpose of obtaining a conservative estimate of charge, measurements of charge concentration on nanoscale asperities in the presence of an ionic fluid are used here. Calibrating charge concentration effects using an environment in which an ionic fluid is present corresponds to the conditions in fluids that contain bacteria or virions in the human biosphere. That is, microbes may be transmitted within saliva or other bodily fluids. Charge concentrations may be larger on dry surfaces. Thus, the calculations and calibrations are indicators of the minimum effects expected from having non-uniform charge on a surface.

Ozcelik, et al. measured charge concentration for nanopatterned surfaces covered with an ionic fluid (H. G. Ozcelik, M Barisik, *Electric charge of nanopatterned silica surfaces*, Physical Chemistry Chemical Physics 21(14) (2019) 7576-7587), which is incorporated herein in its entirety by reference. For example, Ozcelik, et al. measured the surface charge density on 20 nm spherical silica asperities in a 1 mM KCl ionic fluid to be between $7.2 \times 10^{-3}$ $C/m^2$ and $4.9 \times 10^{-3}$ $C/m^2$. Extrapolating from their results using the proportionality relationship from Bhattaharya, assuming a spherical asperity with a 20 nanometer radius in a 1 mM ionic fluid, a charge of $1.6 \times 10^{-19}$ Coulombs for a single proton or electron, one can calculate that 29 excess electrons will be available at the tip region of each nanoprojection. As the projection diameter increases, the estimated number of charges available increases to 460 for an 80 nm diameter projection and to over 1000 electrons for a 120 nm projection. These are large charge concentrations relative to the charge state of microbes, which are vulnerable to charge injection, largely because of their small size. For example, the effects of charge injection into the SARS-CoV-2 virus, which may have diameters between 60 nm and 120 nm, and similar virions can be understood by considering the equilibrium amounts of charge contained within their small volumes. Consider, for comparison, that an 80 nm spherical droplet containing water has a volume of $2.7 \times 10^{-22}$ $m^3$ (2680 femtoliters), corresponding to 12.7 million molecules. For a pH of 7, the positive charge density present in this droplet corresponds to the presence of just 1 positively charged hydrogen ion. At a pH of 5, the number of hydrogen ions is 89. For a 120 nm sphere containing water the number of hydrogen ions is 3 at a pH of 7 and 302 at a pH of 5. Based on the charge densities computed for 20 nanometer to 120 nm asperities in a 1 mM ionic fluid, the numbers of excess charge correspond to from about 29 electrons to over 1000 electrons. These charge values can be compared to isoelectric point (IEP), that is, the pH value at which the virus net charge is zero (B. Michen, T Graule, *Isoelectric points of viruses*, Journal of Applied Microbiology 109(2) (2010) 388-397), which is incorporated herein in its entirety by reference. Experimental data for the IEP of a virus of particular interest, SARS-CoV-2, have been estimated computationally for 13 of its proteins by Scheller, et al. (C. Scheller, F. Krebs, R. Minkner, I. Astner, M Gil-Moles, H. Wätzig, *Physicochemical properties of SARS-CoV-2 for drug targeting, virus inactivation and attenuation, vaccine formulation and quality control*, Electrophoresis 41(13-14) (2020) 1137-1151), which is incorporated herein in its entirety by reference. The accessible exterior membrane protein IEP values are 6.24, 8.57, and 9.51 for the spike protein, membrane protein, and envelope small membrane protein, respectively. Recalling that a pH of 7 corresponds with the condition of having a single positive charge, in an 80 nm diameter spherical volume, the closeness of the virus protein isoelectric points to a pH of 7 suggests that having 29 to over 1000 charges available from each nanoprojection to transfer to a single virion will cause overwhelming disruption.

Non-uniformity of charge on a surface also facilitates adsorption of virus onto the surface. Regardless of whether capsid proteins of a virus are positively or negatively biased, or whether bacterial membranes and appendages are positively or negatively biased, there will be surface regions of varying charge and polarity that favor adsorption. Charge gradients will facilitate adsorption of microbes onto the tips 3 of projections 4 or onto the surfaces 1 in between the projections 4. It is for this reason that the intra-projection spacing should be sufficiently large to allow microbes to adsorb and attach to the substrate surface 1. In measurements of the effects of nanotopography on forces of adhesion between a nano-smooth surface and an atomic force microscope probe by Rabinovich, et al. (Y. I. Rabinovich, J. J. Adler, A. Ata, R. K. Singh, B. M. Moudgil, *Adhesion between Nanoscale Rough Surfaces: I. Role of Asperity Geometry*, Journal of Colloid and Interface Science 232(1) (2000) 10-16), which is incorporated herein in its entirety by reference, the greatest adhesion was measured for a nano-smooth surface with a root mean square (rms) roughness of 0.17 nm. The force of adhesion decreased with increasing roughness by a factor of 5 for a 10.5 nm rms roughness. Comparable results have been reported for surfaces with roughnesses up to 1500 nm (K. N. G. Fuller, D. Tabor, *The effect of surface roughness on the adhesion of elastic solids*, Proceedings of the Royal Society of London. A. Mathematical and Physical Sciences 345(1642) (1975) 327-342), which is incorporated herein in its entirety by reference. In these studies, the adhesive interaction is with micron-sized particles whose size is greater than the wavelength of modulations in the surface. Consequently, this disclosure identifies polycrystalline substrates with constituent crystals having smooth surface regions spanning dimensions slightly larger than the maximum size of the target microbe to be inactivated. In this way, regions for stable attachment will exist for microbes adsorbed out of carrier fluids. This approach is consistent with the observation that for some strains of bacterial cells, higher levels of attachment are reported for nano-smooth surfaces (S. Wu, S. Altenried, A. Zogg, F. Zuber, K. Maniura-Weber, Q. Ren, *Role of the Surface Nanoscale Roughness of Stainless Steel on Bacterial Adhesion and Microcolony Formation*, ACS Omega 3(6) (2018) 6456-6464), which is incorporated herein in its entirety by reference.

Enhancing the efficacy of antimicrobial copper and other metal surfaces depends upon increasing the magnitude of charge available to be transferred to an adsorbed microbe. For deactivating viruses, in contrast to bacteria, the adsorption and deactivation on a nominally dry surface depends primarily on electrostatic interactions. The tendency for the adsorption of viruses to surfaces has been correlated with their isoelectric point (IEP), that is, the pH value at which the virus net charge is zero (B. Michen, T. Graule, *Isoelectric points of viruses*, Journal of Applied Microbiology 109(2) (2010) 388-397), which is incorporated herein in its entirety by reference. Electrical repulsion and solubility are lowest when the virus exists at its IEP. Experimental data for the IEP of a virus of particular interest, SARS-CoV-2 have been estimated computationally for 13 of its proteins by Scheller, et al. (C. Scheller, F. Krebs, R. Minkner, I. Astner, M. Gil-Moles, H. Wätzig, *Physicochemical properties of SARS-CoV-2 for drug targeting, virus inactivation and attenuation, vaccine formulation and quality control*, Electrophoresis 41(13-14) (2020) 1137-1151), which is incorporated herein in its entirety by reference. The exterior accessible membrane protein IEP values are 6.24, 8.57, and 9.51 for the spike protein, membrane protein, and envelope small membrane protein, respectively. This range of IEP values is congruent with the range of pH found in saliva (6.2-7.6) and respiratory aerosols (7.5-8.3) (H. Zhang, D. Li, L. Xie, Y. R. Koczulla, S. Dragonieri, R. Schot, R. Bals, S. A. Gauw, C. Vogelmeier, K. F. Rabe, P. J. Sterk, P. S. Hiemstra, *Comparison of exhaled breath condensate pH using two commercially available devices in healthy controls, asthma and COPD patients*, Respiratory Research 10(1) (2009) 78), which is incorporated herein in its entirety by reference.

Thus, for the typical mode of virus transmission, particularly for SARS-CoV-2, adsorption may readily occur onto surfaces 1 with projections 4 separated by distances greater than D4 (shown in FIG. 1).

Enhancing the efficacy of a surface 1 comprising antimicrobial copper depends upon increasing the magnitude of charge available through crafting the appropriate nanotopography. Suitable virucidal topographies differ from bactericidal nanotopographies, such as those that have been documented for several systems, including natural protrusion on insect wings (S. Pogodin, J. Hasan, Vladimir A. Baulin, Hayden K. Webb, Vi K. Truong, The H. Phong Nguyen, V. Boshkovikj, Christopher J. Fluke, Gregory S. Watson, Jolanta A. Watson, Russell J. Crawford, Elena P. Ivanova, *Biophysical Model of Bacterial Cell Interactions with Nanopatterned Cicada Wing Surfaces, Biophysical Journal* 104 (4) (2013) 835-840), which is incorporated herein in its entirety by reference. The bactericidal mechanism depends upon the interaction of multiple protrusions with the bacterial membranes, including puncture and stretching to rupture. The different physio-chemical properties of SARS-CoV-2 virus favor different inactivation mechanisms. Mechanisms of SARS-CoV-2 inactivation and attenuation have been reviewed by Scheller et al. (C. Scheller, F. Krebs, R. Minkner, I. Astner, M. Gil-Moles, H. Wätzig, *Physico-chemical properties of SARS-CoV-2 for drug targeting, virus inactivation and attenuation, vaccine formulation and quality control, Electrophoresis* 41(13-14) (2020) 1137-1151), which is incorporated herein in its entirety by reference. The effects of pH on infectivity are presented, showing that extreme alkalinity (pH 12-14) and high acidity (pH 1-3) both inactivate SARS-CoV-1. However, no attempt is made to extend these results to surmise their implications for the effects of enhanced positive charge or negative charge on solid substrates.

Since the amount of charge concentration available relative to the charge content of a microbe is overwhelming within the entire range of lengths and diameters prescribed in this disclosure for deactivating viruses and bacteria, a broad range of surface geometries can possess enhanced antimicrobial effects. One embodiment of nanoprojection characteristics for deactivating a population of microbes is defined in terms of the specification of four dimensions, illustrated schematically in FIG. 1 as D4, D2, D3, and D5. Referring to FIG. 1, the projection spacing is specified to maximize adsorption of pathogens. The minimum spacing of projections D4 is about 5% greater the sum of maximum feret diameter of the target microbe and a distance equal to twice the base radius D2 of the projection 4. For example, for a virus with a maximum feret diameter of 120 nm, such as SARS-CoV-2, the following condition applies: $(D4)>(2\times D2+120 \text{ nm})\times 1.05$. If, for example, $D2=25$ nm, then D4 is equal to or greater than 178.5 nm. The maximum spacing of projections may be less than 9 times the maximum feret diameter of the target microbe in order for an adequate density of charge gradients to be available. Further, the projection base radius D2 that will maximize the amount of charge available to transfer to a microbe prior to, or after, its adsorption onto the substrate, is a value equal to or less than one-half the maximum feret diameter of the microbe to be inactivated. The projection base radius, in combination with the projection spacing ensures the highest density of projections are available to inactivate 100% of a pathogenic microbial population. D3 and D5 will now be described. In one embodiment, to achieve a greater than 50% elevation of charge at the projection tip relative to the charge at in the base substrate, the values of $(D2-D5)/D3$ is less than or equal to about 0.1763. Many combinations of D2, D3, and D5 can satisfy this relationship. In at least one embodiment, the combination of these three dimensions are when D2 is 2-fold smaller than D3. In other embodiments, the combination of these three dimensions are when D2 is 5-fold smaller than D3. In still other embodiments, the combination of these three-dimensions may be when D2 is greater than or less than 5-fold smaller than D3. In at least one embodiment, 50% of the projections 4 may satisfy the criterion that D3 is greater than or equal to 2×D2. In other embodiments, 50% of the projections 4 may satisfy the criterion that D3 is greater than or equal to 5×D2. These relationships, in combination, define the spacing, size, and shape of projections that will transfer the most charge to inactivate or kill microbes.

A means to establish and control the projection spacing D4 described above according to at least one embodiment of the present disclosure is provided. This can be accomplished by modifying a metallic substrate to possess two essential microstructural characteristics. The first microstructural characteristic is that the grain boundaries possess high-angle inter-grain misorientations. Specifically, greater than 50% of the grain boundaries may have grain boundary misorientation angles greater than 15°. Second, in at least one embodiment, the grain size of the metallic substrate is such that the 65% of the measured grain boundary intercept lengths are greater than the maximum feret diameter of the target microbes. It will be appreciated that in other embodiments the grain size of the metallic substrate is such that less than or greater than 65% of the measured grain boundary intercept lengths are greater than the maximum feret diameter of the target microbes. There are two reasons for these specifications for grain size and grain boundary misorientation. Grain boundaries with high-angle misorientations help ensure that projections nucleate and grow primarily at grain boundaries, rather than from intra-grain surfaces. High-angle grain boundaries possess higher energy, greater disorder, and therefore facilitate faster diffusion along the boundaries (G. S. Rohrer, *Grain boundary energy anisotropy: a review, Journal of Materials Science* 46(18) (2011) 5881-5895), which is incorporated herein in its entirety by reference. Since the dominant atomistic-level mechanism by which projections form from metallic substrates is by grain boundary diffusion (Sun, et al., *Adv. Functional Matls.*, 2019, 1906504), which is incorporated herein in its entirety by reference, having higher angle grain boundaries differentiates the boundary regions from the intra-grain surface regions, increasing the growth of projections from grain boundaries. At least one implementation of a metallic substrate on which to grow nanoprojections has the greatest possible difference in rate of diffusion at grain boundaries compared to the rate of bulk diffusion near regions away from grain boundaries.

At least one factor for the formation of protrusions includes relaxation of internal stresses. Therefore, it is possible to nucleate projections from intra-grain surface regions that contain high densities of dislocations and associated microscale internal stresses. The spacing of intra-grain projections may be uncontrolled. Therefore, having high-angle grain boundaries increases the rate of diffusion within the boundaries and also the rate of growth of projections from grain boundary regions. The much accelerated rate of grain boundary diffusion should be increased such that intra-grain projections do not have an opportunity to form during the period that projections nucleate and grow from grain boundaries. While it is possible for projections to nucleate from intra-grain regions, the rates of nucleation and growth will be many times lower than the rates existing at the high-angle grain boundaries. When nanoprojections form mainly at grain boundaries, the separation of nanoprojections can be controlled by controlling grain size, or more specifically, the distribution of grain boundary intercept lengths.

Grain size and grain boundary energies can both be controlled by imposing High Shear Deformation (HSD) at or on the surface of a polycrystalline substrate. The theory for how grain size and grain boundary characteristics can be controlled by imposing large deformation has been summarized by Valiev, et al. (R. Z. Valiev, R. K. Islamgaliev, I. V. Alexandrov, *Bulk nanostructured materials from severe plastic deformation, Progress in Materials Science* 24 (2000) 103-189), which is incorporated herein in its entirety by reference. Deformations to effective strains much greater than four (4) can refine grain size by a form of dynamic recrystallization. This phenomenon of dynamic crystallization can produce average grain sizes between 20 nm and 2 micrometers, depending upon the alloy. Sakai, et al. have summarized deformation-induced dynamic recrystallization for multiple alloy systems (T. Sakai, A. Belyakov, R. Kaibyshev, H. Miura, J. J. Jonas, *Dynamic and post-dynamic recrystallization under hot, cold and severe plastic deformation conditions, Progress in Materials Science* 60 (2014) 130-207), which is incorporated herein in its entirety by reference. Grain boundaries produced by such large deformations also develop high-angle grain-to-grain misorientations. High-angle grain boundaries possess higher energies, higher specific atomic volume, and consequently, have higher grain boundary diffusivities. The range of grain sizes needed within a metallic substrate to cultivate nanoprojections with antimicrobial effects enhanced by charge transfer is between 20 nm and 2500 nm. This level of grain size refinement is described by, for example, as shown by Horita and Langdon for copper (Z. Horita, T. G. Langdon, *Microstructures and microhardness of an aluminum alloy and pure copper after processing by high-pressure torsion, Materials Science and Engineering: A* 410-411 (2005) 422-425), which is incorporated herein in its entirety by reference. Such grain boundaries facilitate the growth of surface projections.

For the purpose of achieving grain size control, especially at the surface of a metal substrate, the method of High Pressure Compressive Shear (HPCS), as proposed by Toth, et al. (L. S. Toth, V. Q. Vu, S. S. Dhinwal, Y. Zhao, R. Massion, C. Chen, C. F. Davis, T. C. Lowe, *The mechanics of High Pressure Compressive Shearing with application to ARMCO® steel, Materials Characterization* 154 (2019) 127-137), which is incorporated herein in its entirety by reference, is particularly effective. HPCS is readily able to impart arbitrarily large surface shear strains, particularly for strip, plate, and sheet forms forms of metal substrates. To demonstrate the method, a 99.9% copper substrate in the form of a strip was subject to a shear strain of 19. It will be appreciated that in other methods, the shear strain may be less than, greater than, or equal to 4. The average grain diameter was reduced to 213 nm corresponding to having 93.4% of the 6895 grain intercepts sampled possessing lengths less than 568 nm. The combination of HPCS parameters to produce substrates suited for nucleating projections with spacings suited to deactivate specific microbes can be determined through HPCS process trials. The trials reported here were conducted in support of this disclosure for the purpose of demonstrating at least one embodiment of a method to fabricate substrate microstructures for at least one alloy suited for growing nanoprojections that create the non-uniform surface charge state needed to impart biocidal effects.

Figure 3:
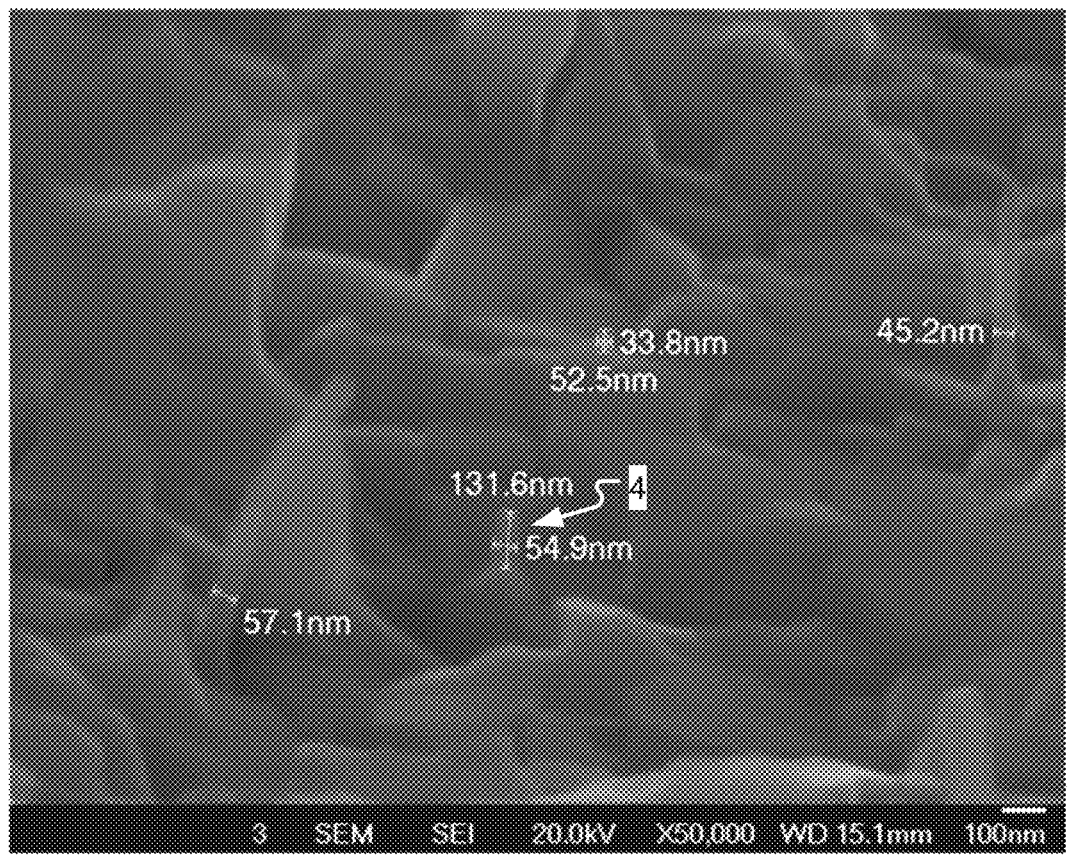
FIG. 3 is a scanning electron micrograph showing a small population of nanoprojections on 99.9% copper grown by thermal oxidation to have dimensions suited for deactivating microbes according to at least one embodiment of the present disclosure.

One embodiment of a method to nucleate and grow projections on a substrate is thermal oxidation. Thermal oxidation treatments were applied to a 99.9% copper alloy in the form of 5 mm wide strips. Temperatures between 300° C. and 550° C. were applied to substrates for durations of 1.5 minutes to 30 minutes. A scanning electron micrograph showing an example of projections 4 formed on the 99.9% copper substrate thermally oxidized for 30 minutes at 550° C. appears in FIG. 3. Measured diameters of projections ranged from 33.8 nm to 57.1 nm. Projection heights were measured and are noted in FIG. 3 for nanoprojections that extend 52.5 nm and 131.6 nm above the substrate base. Longer projections, exceeding 250 nm can also be seen. Nanoprojection diameters between 33.8 nm 57.1 nm are shown. These nanoprojections possess the combination of dimensions that should be effective in inactivating microbes. The thermal oxidation trials were conducted in support of this disclosure to show at least one embodiment of a process to fabricate surface projections with dimensions suited for creating a non-uniform surface charge state that can deactivate microbes.

Figure 4:
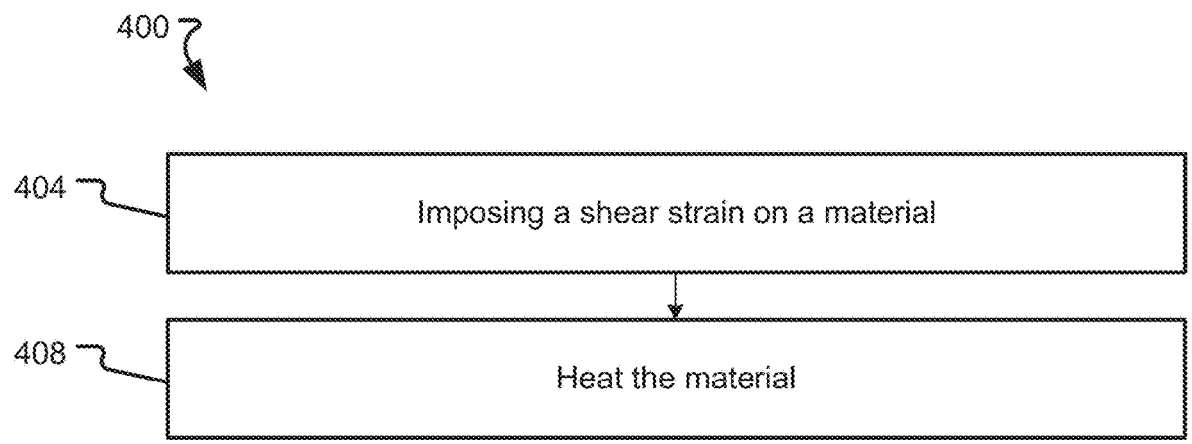
FIG. 4 is a flowchart according to at least one embodiment of the present disclosure.

FIG. 4 depicts a method 400 that may be used, for example, for manufacturing a material with projections for disrupting a microbe species.

The method 400 comprises imposing a shear strain on a material (step 404). The material may be, for example, copper. In other embodiments, the material may include metals systems within the periodic table of elements includes metals and alloys from Group 1 (e.g., Lithium (Li), Sodium (Na), Potassium (K)), Group 2 (e.g., Magnesium (Mg), Calcium (Ca)), Group 11 (e.g., Copper (Cu), Silver (Ag)), or Group 12 (e.g., Zinc (Zn)) or Group 13 (e.g., Aluminum (Al)). In some embodiments, the material has a width of approximately 5 mm, though it will be appreciated that in other embodiments, the material may have a width greater than or less than 5 mm. In still other embodiments, the material may be at least one of a wire, strip, rod, or any form of solid and the material may have dimensions in any of three orthogonal directions not less than, for example, 1 micrometer. The shear strain imposed on the material may be 4, though it will be appreciated that in other embodiments, the shear strain may be greater than or less than 4. In embodiments where the shear strain imposed on the material is, for example, 19, an average grain size of approximately 213 nm may be produced and approximately 93.4% of grain intercepts of the material may have a length less than 568 nm. It will be appreciated that in other embodiments, a shear strain of any value may be imposed to provide an average grain size less than or greater than 213 nm and a grain intercept having a length less than, greater than, or equal to 568 nm.

The method 400 also comprises heating the material (step 408). The material may be heated using thermal oxidation treatments. The material may be heated to between approximately 300° C. and 550° C. for between approximately 1.5 minutes to 30 minutes to create the plurality of projections that disrupt the microbe species. It will be appreciated that in other embodiments, the material may be heated to less than 300° C. or greater than 550° C. It will also be appreciated that in other embodiments, the material may be heated for less than 1.5 minutes or more than 30 minutes. Each projection of the plurality of projections formed may have a diameter between approximately 33.8 nm and 57.1 nm. It will be appreciated that in other embodiments, each projection may have a diameter less than 33.8 nm or greater than 57.1 nm. In still other embodiments, greater than half of the plurality of projections may have a diameter between approximately 33.8 nm and 57.1 nm. Each projection of the plurality of projections formed may have a projection height between approximately 52.5 nm and 131.6 nm. It will be appreciated that in other embodiments, each projection may have a height less than 52.5 nm or greater than 131.6 nm. In still other embodiments, greater than half of the plurality of projections may have a projection height between approximately 52.5 nm and 131.6 nm.

The present disclosure encompasses embodiments of the method 400 that comprise more or fewer steps than those described above, and/or one or more steps that are different than the steps described above.

Figure 5:
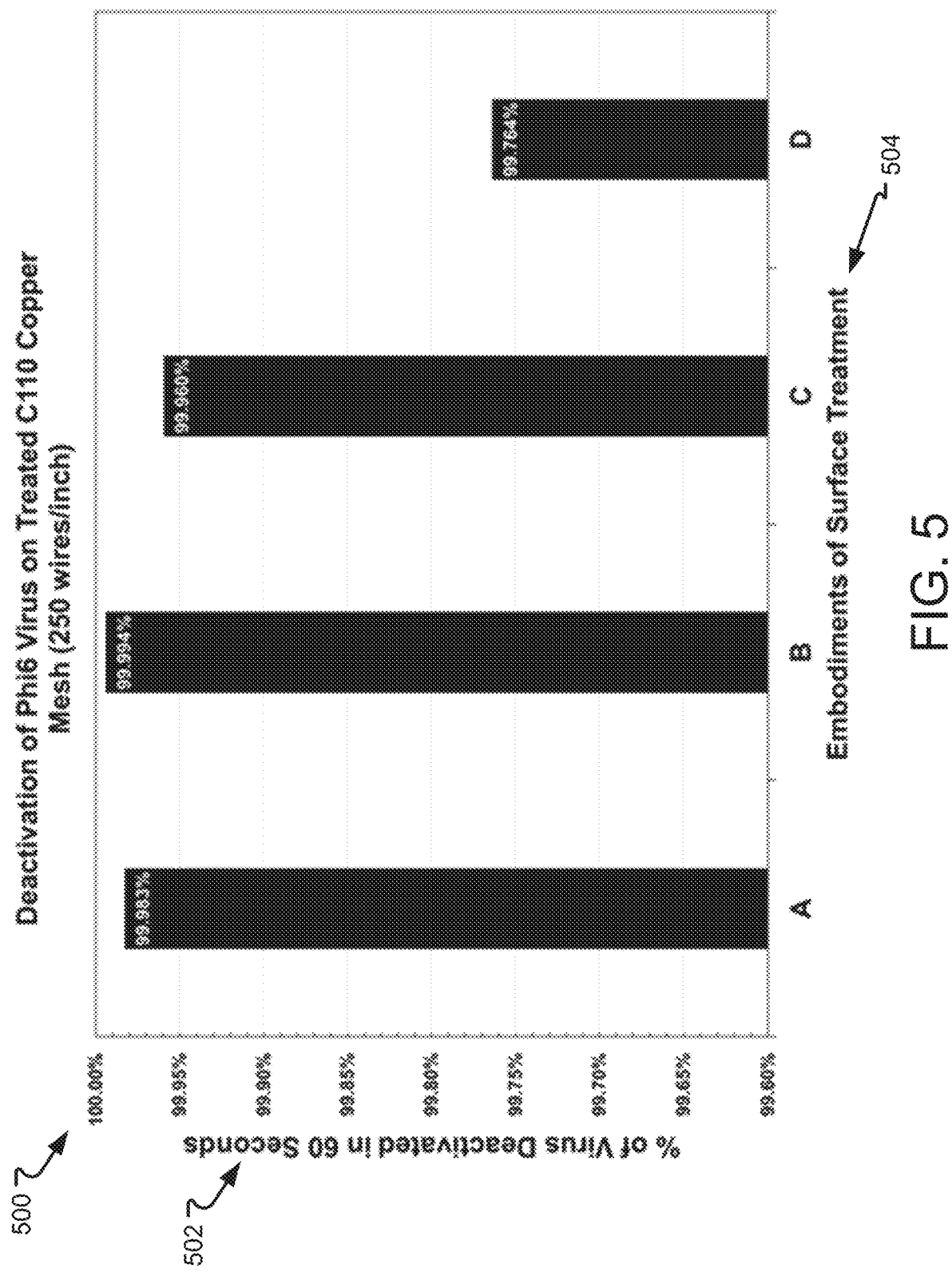
FIG. 5 is a bar chart according to at least one embodiment of the present disclosure.

Turning to FIG. 5, a bar chart 500 illustrating results of independent virucidal testing conducted at The BioScience Center (Albuquerque, NM) is shown. The bar chart 500 comprises a Y-axis 502 designating a percentage of virus deactivated in 60 seconds and an X-axis 504 designating embodiments of surface treatment. The testing demonstrated how four variations of using, for example, the method 400 resulted in four different degrees of deactivation of a Phi6 virus, a surrogate for the SARS-CoV-2 virus. Within 60 seconds between 99.99% and 99.765% was deactivated for process variations designated A, B, C, and D in FIG. 5. In some embodiments, A, B, and C may correspond to different durations for which method 400 is applied, which D may correspond to a different number of months between when method 400 was applied and when the virucidal response was measured.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed embodiments, configuration, and aspects.

The exemplary systems and methods of this disclosure have been described in relation to nanoscale metal or metal oxide projections on a surface of a metal substrate. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A metallic material for disrupting a microbe species, comprising:

a substrate surface; and at least one nanoscale projection extending from the substrate surface, the at least one nanoscale projection configured to induce a non-uniform charge to at least one of reduce or eliminate a pathogenicity of microbes by a charge transfer.

2. The metallic material of claim 1, wherein the metallic material is implemented using at least one of a metal or alloy object and comprising at least one of a sheet, strip, bar, plate, rod, wire, or other solid shape produced by at least one of drawing, rolling, stamping, extrusion, casting, or solidification.

3. The metallic material of claim 1, wherein each nanoscale projection has a diameter at each base where each nanoscale projection emerges from the substrate surface, and wherein the metallic material is implemented with 50% of the nanoscale projections having a base diameter that is equal to or less than one-half a maximum feret diameter of the microbe species.

4. The metallic material of claim 1, wherein each nanoscale projection has a radius at each base where each nanoscale projection emerges from the substrate surface, wherein each nanoscale projection has a tip spaced a height from the substrate surface, each tip having a radius, and wherein the difference between a base radius and a tip radius of at least 65% of the nanoscale projections, normalized by a projection height minus the tip radius, is less than or equal to 0.1763.

5. The metallic material of claim 1, wherein each nanoscale projection has a radius at each base where each nanoscale projection emerges from the substrate surface, wherein each nanoscale projection has a tip spaced a height from the substrate surface, and wherein a height of each nanoscale projection is 2-fold greater than a base radius for at least 50% of the nanoscale projections.

6. The metallic material of claim 2, wherein at least 50% of the nanoscale projections are located at intersections of substrate grain boundaries and the substrate surface.

7. The metallic material of claim 2, wherein the at least one of a metal or alloy object is produced using high shear deformation to increase a density of grain boundary sites for nucleating and growing projections, corresponding to having 65% of all surface grains possessing grain boundary intercept lengths between 1.05 times and 9 times a maximum feret diameter of the microbe species.

8. The metallic material of claim 2, wherein 50% of grain boundaries intersecting the substrate surface have grain-to-grain misorientation angles greater than 15°.

9. The metallic material of claim 2, wherein an average grain size at the substrate surface is between 0.020 micrometers and 2.5 micrometers.

10. The metallic material of claim 2, wherein the at least one of a metal or alloy object comprises more than 60 weight percent copper, zinc, lithium, sodium, potassium, magnesium, calcium, aluminum, or silver.

11. A method of manufacturing a metallic material with projections for disrupting a microbe species having a maximum feret diameter, comprising:

imposing a shear strain of greater than 4 on the metallic material to produce an average grain size between 200 nm and 2000 nm; and heating the metallic material to between approximately 300° C. and 550° C. for between approximately 1.5 minutes to 30 minutes to create the plurality of projections that disrupt the microbe species, wherein the metallic material comprises:

a substrate surface; and at least one nanoscale projection extending from the substrate surface, the at least one nanoscale projection configured to induce a non-uniform charge to at least one of reduce or eliminate a pathogenicity of microbes by a charge transfer.

12. The metallic material of claim 1, wherein the at least one nanoscale projection comprises a plurality of nanoscale projections, and at least half of the plurality of nanoscale projections have a diameter greater than 10 nm.

13. The metallic material of claim 1, wherein the at least one nanoscale projection comprises a plurality of nanoscale projections, and at least half of the plurality of nanoscale projections have a projection height greater than 20 nm.

14. The metallic material of claim 1, wherein the microbe species is SARS COV02.

15. The metallic material of claim 1, wherein a maximum feret diameter of the microbe species is 120 nm.

16. The metallic material of claim 15, wherein more than 50% of grain boundary intercept lengths of the metallic material are greater than the maximum feret diameter.

17. The metallic material of claim 15, wherein a minimum spacing of adjacent nanoscale projections of the at least one nanoscale projection is 5% greater than a sum of the maximum feret diameter and two times a radius of a base of a nanoscale projection.

18. The metallic material of claim 15, wherein the at least one nanoscale projection is separated from another nanoscale projection by a distance in a plane of the substrate surface that is 5% greater than a maximum feret diameter of the microbial species.

19. The metallic material of claim 1, wherein the nanoscale projection comprises at least one of a metal and a metal oxide.

* * * * *